(12) United States Patent
Kurtzberg et al.

(10) Patent No.: US 6,498,986 B1
(45) Date of Patent: Dec. 24, 2002

(54) METHOD AND SYSTEM FOR ENABLING AUTOMATIC VEHICLE ROUTING

(75) Inventors: Jerome M. Kurtzberg, Yorktown Heights, NY (US); Menachem Levanoni, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/374,698

(22) Filed: Jun. 14, 1999

(51) Int. Cl.[7] .................. G06F 165/00; G08G 1/123
(52) U.S. Cl. .................. 701/213; 701/208; 701/210; 340/990; 340/995; 340/905; 342/357; 342/457; 342/454
(58) Field of Search .................. 701/213, 209, 701/211, 202, 210; 340/995, 990, 988

(56) References Cited

U.S. PATENT DOCUMENTS

| | | | | |
|---|---|---|---|---|
| 5,359,529 A | * | 10/1994 | Snider | 701/207 |
| 5,508,931 A | * | 4/1996 | Snider | 701/207 |
| 5,774,073 A | * | 6/1998 | Maekawa et al. | 340/995 |
| 5,902,349 A | * | 5/1999 | Endo et al. | 701/202 |
| 5,911,773 A | * | 6/1999 | Mutsuga et al. | 701/200 |
| 5,974,356 A | * | 10/1999 | Doyle et al. | 701/209 |
| 6,034,626 A | * | 3/2000 | Maekawa et al. | 340/995 |
| 6,216,088 B1 | * | 4/2001 | Schulz et al. | 701/209 |
| 2001/0014849 A1 | * | 8/2001 | King et al. | 701/210 |

* cited by examiner

Primary Examiner—William A. Cuchlinski, Jr.
Assistant Examiner—Tuan C To
(74) Attorney, Agent, or Firm—Stephen C. Kaufman, Esq; McGinn & Gibb, PLLC

(57) ABSTRACT

A computer method suitable for use with a vehicle. The method comprises the steps of using a Global Positioning System (GPS) as a first order mechanism for guiding the vehicle pursuant to a current destination and in accordance with a statically determined vehicle trajectory; monitoring real time dynamic factors relating to the current vehicle trajectory; creating a branching condition for determining if the GPS first order mechanism must be modified responsive to the real time dynamic factors; and activating an instantaneous vehicle replacement trajectory depending on the branching condition such that the replacement trajectory accommodates the effects of the real time dynamic factors by providing a second order GPS mechanism.

11 Claims, 3 Drawing Sheets

METHOD AND SYSTEM FOR ENABLING AUTOMATIC VEHICLE ROUTING

FIELD OF THE INVENTION

This invention relates to a method and system for enabling automatic vehicle routing.

INTRODUCTION TO THE INVENTION

Methods and systems for enabling automatic vehicle routing are known, and include, illustratively, the LORAN (long-distance radio navigation system) and the GPS (Global Positioning System). These systems are essentially passive, one way systems; that is, they provide a driver of the vehicle position information that is a priori and perhaps dated or qualified, with respect to dynamic or instantaneous user requirements.

SUMMARY OR THE INVENTION

Our work includes efforts to improve extant vehicle routing systems, of the type realized by GPS, to an end of enabling them with a capability for being responsive to dynamic or instantaneous user requirements.

Accordingly, the present invention in a first aspect discloses a computer method suitable for use with a vehicle, the method comprising the steps of:

(i) using a Global Positioning System (GPS) as a first order mechanism for guiding the vehicle pursuant to a current destination and in accordance with a statically determined vehicle trajectory;

(ii) monitoring real time dynamic factors relating to the current vehicle trajectory;

(iii) creating a branching condition for determining if the GPS first order mechanism must be modified responsive to the step (ii) real time dynamic factors; and (iv) activating an instantaneous vehicle replacement trajectory depending on the step (iii) branching condition such that the replacement trajectory accommodates the effects of the real time dynamic factors by providing a second order GPS mechanism.

Step (i) of the method contemplates employment of effective equivalents of the Global Positioning System, for example, the aforementioned LORAN.

Step (ii) of the method may include monitoring real time dynamic factors selected from the group consisting of road conditions, traffic conditions, and weather conditions.

Step (iii) preferably includes evaluating the effects of a real time dynamic factor on the statically determined vehicle trajectory relative to alternative trajectories. For example, step (iii) may include a step of making a decision whether or not an alternative trajectory is to replace the statically determined vehicle trajectory.

The present invention in a second aspect discloses a program storage device readable by machine, tangibly embodying a program of instructions executable by the machine to perform method steps for extending the utility of a Global Positioning System (GPS), the method comprising the steps of:

(i) using a Global Positioning System (GPS) as a first order mechanism for guiding the vehicle pursuant to a current destination and in accordance with a statically determined vehicle trajectory;

(ii) monitoring real time dynamic factors relating to the current vehicle trajectory;

(iii) creating a branching condition for determining if the GPS first order mechanism must be modified responsive to the step (ii) real time dynamic factors; and (iv) activating an instantaneous vehicle replacement trajectory depending on the step (iii) branching condition such that the replacement trajectory accommodates the effects of the real time dynamic factors by providing a second order GPS mechanism.

The present invention in a third aspect discloses a computer system suitable for extending the utility of a Global Positioning System (GPS), the system comprising:

(i) means for inputting to a CPU a Global Positioning System (GPS) which is a first order mechanism for guiding the vehicle pursuant to a current destination and in accordance with a statically determined vehicle trajectory;

(ii) CPU means for monitoring real time dynamic factors relating to the current vehicle trajectory;

(iii) CPU means for creating a branching condition for determining if the GPS first order mechanism must be modified responsive to the real time dynamic factors;

(iv) CPU means for activating an instantaneous vehicle replacement trajectory depending on the branching condition such that the replacement trajectory accommodates the effects of the real time dynamic factors by providing a second order GPS mechanism; and (v) display means for showing a replacement trajectory.

BRIEF DESCRIPTION OF THE DRAWING

The invention is illustrated in the accompanying drawing, in which.

DETAILED DESCRIPTION OF THE INVENTION

The invention, as summarized above, enables improved performance of a GPS device. The invention is readily retrofitted to any commercially available such GPS device. Data from a GPS device may be input to a central processing unit (CPU) for processing in accordance with principles of the invention, as shown in FIG. 1 comprising a flowchart 10.

Figure 1:
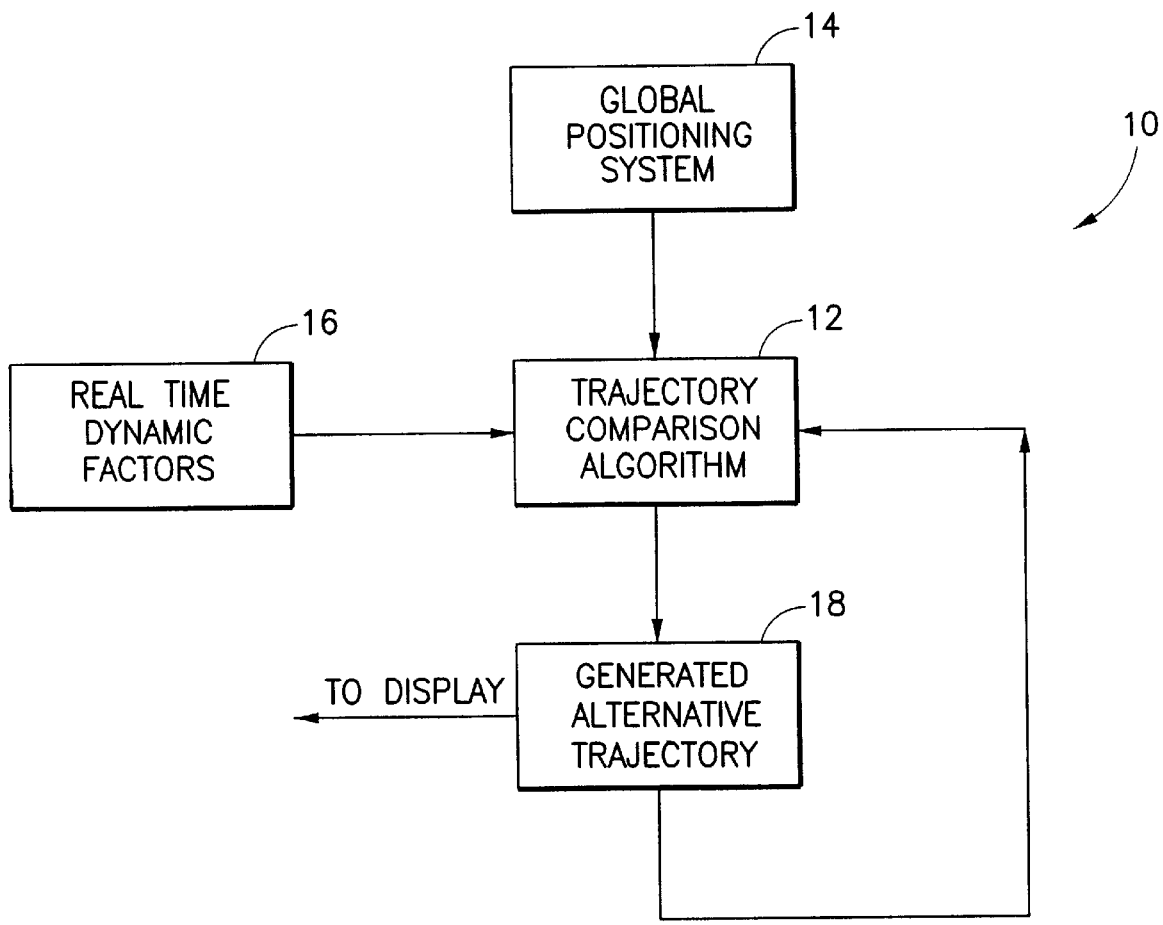
FIG. 1 shows a flowchart for realization of the present invention.

In particular, the FIG. 1 flowchart 10 includes a trajectory comparison algorithm 12 for receipt of the GPS data 14. The trajectory comparison algorithm 12, in turn, communicates with modules real time dynamic factor 16 and generated alternative trajectory 18.

Figure 2:
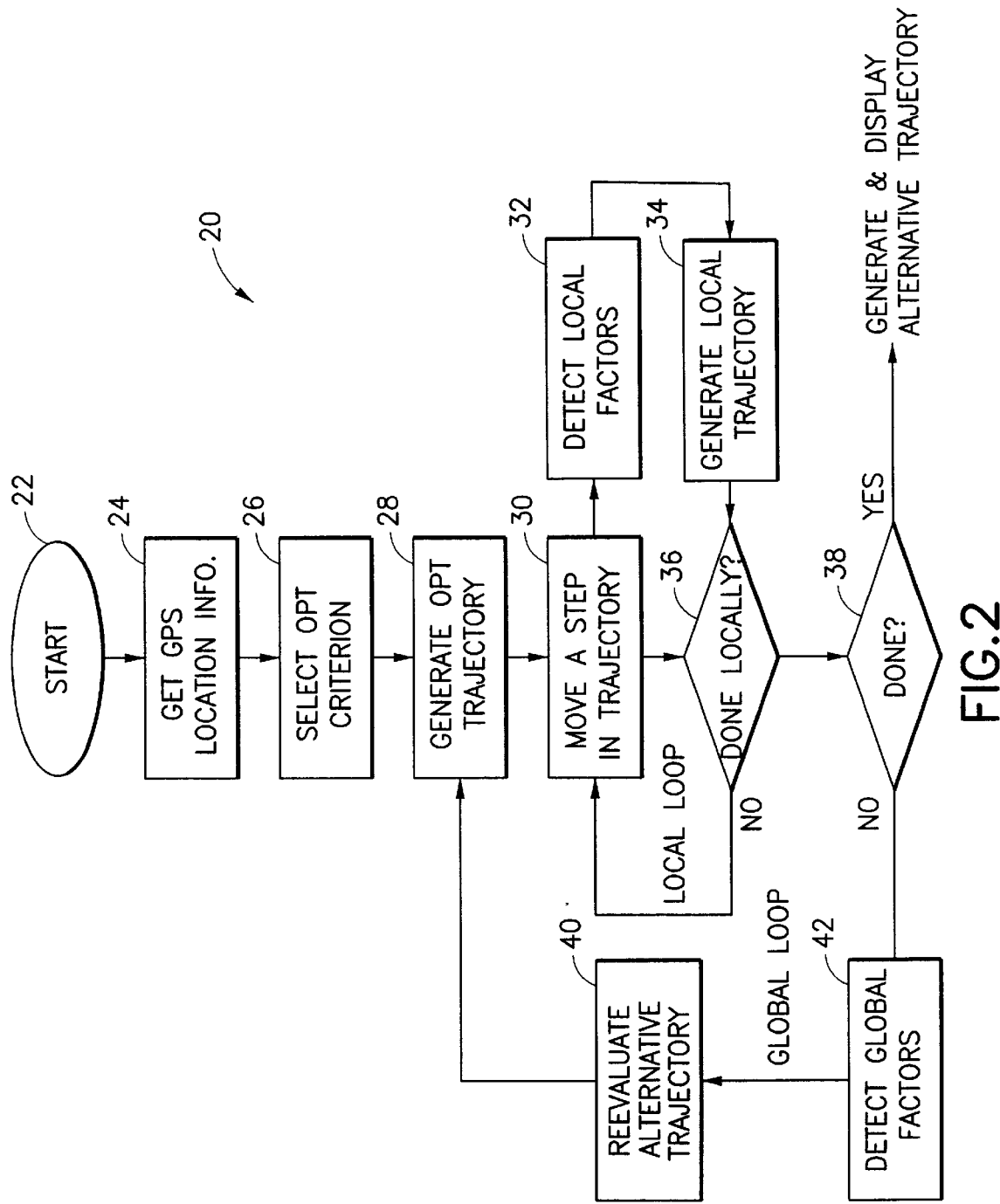
FIG. 2 shows a flowchart in amplification of aspects of the FIG. 1 flow chart.
Figure 3:
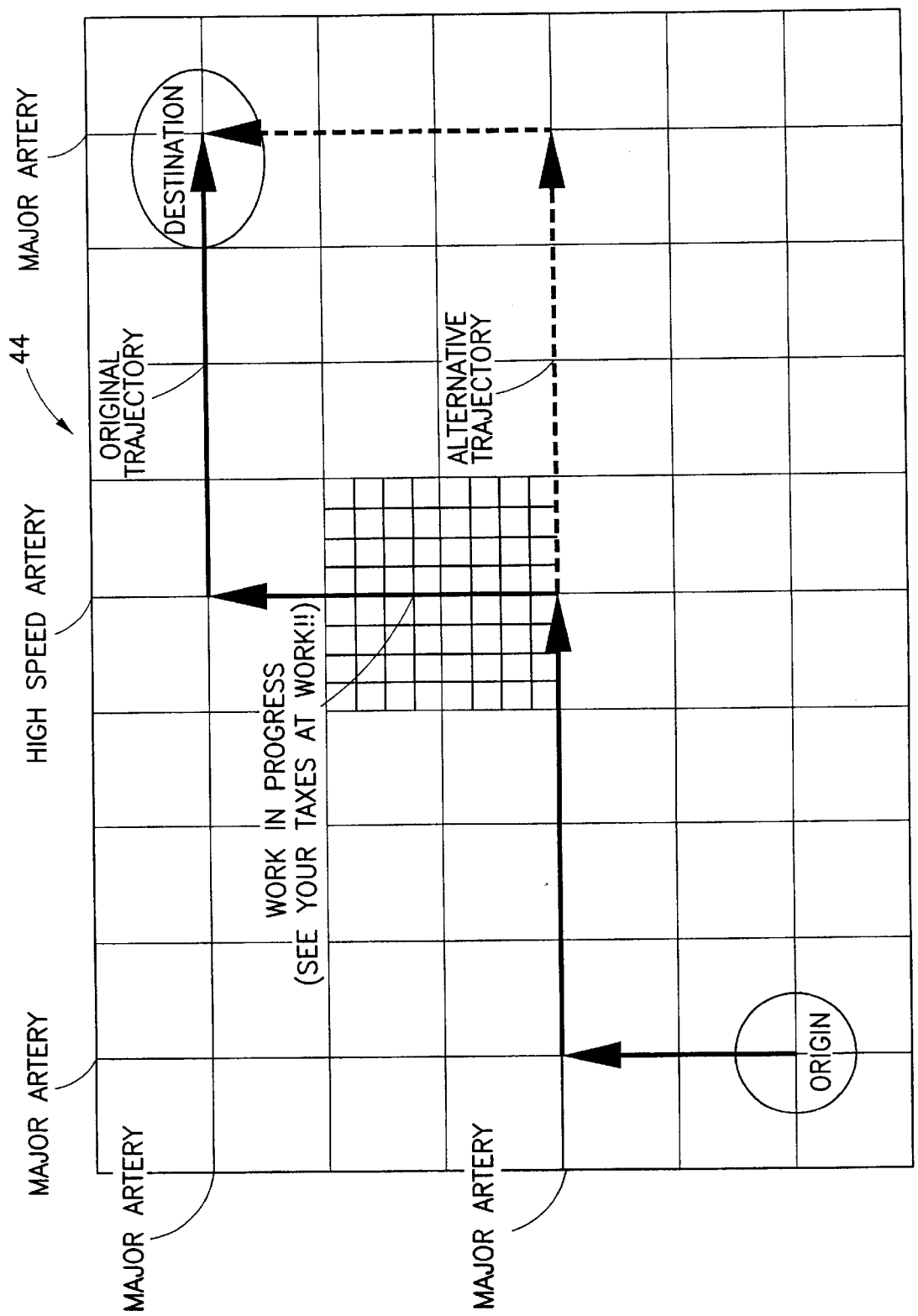
FIG. 3 shows a schematic in favor of an example of the present invention.

FIG. 2 provides an in-depth flowchart (20–42) of operations summarized in the FIG. 1 trajectory comparison algorithm 12. The details of the FIG. 2 flowchart are highlighted by referencing FIG. 3, which incorporates an Example of the present invention. FIG. 3 shows that an originally GPS computed trajectory (black font) is favorably replaced by the dotted line alternative trajectory, in response to road obstruction; and pursuant to computation and solution of the trajectory comparison algorithm 12.

What is claimed:

1. A computer method suitable for use with a vehicle, said method comprising:

using a positioning system as a first order mechanism for guiding said vehicle pursuant to a current destination and in accordance with a statically determined vehicle trajectory;

monitoring real time dynamic factors relating to a current vehicle trajectory, said real time dynamic factors comprising at least one of road conditions and weather conditions;

creating a branching condition for determining whether said first order mechanism must be modified responsive to said real time dynamic factors; and activating an instantaneous vehicle replacement trajectory depending on said branching condition such that said replacement trajectory accommodates effects of said real time dynamic factors by providing a second order mechanism according to said positioning system.

2. A method according to claim 1, wherein said real time dynamic factors further comprise time of day.

3. A method according to claim 1, wherein said creating a branching condition comprises evaluating effects of a real time dynamic factor on said statically determined vehicle trajectory relative to alternative trajectories.

4. A method according to claim 3, wherein said creating a branching condition comprises deciding whether an alternative trajectory is to replace the statically determined vehicle trajectory.

5. A method according to claim 3, wherein said creating a branching condition comprises deciding whether an alternative trajectory is to replace a previously determined alternative trajectory.

6. A program storage device readable by machine, tangibly embodying a program of instructions executable by said machine to perform method steps for extending a utility of a Global Positioning System (GPS), said method comprising:

using a Global Positioning System (GPS) as a first order mechanism for guiding said vehicle pursuant to a current destination and in accordance with a statically determined vehicle trajectory; monitoring real time dynamic factors relating to a current vehicle trajectory, said real time dynamic factors comprising at least one of road conditions and weather conditions;

creating a branching condition for determining if said GPS first order mechanism must be modified responsive to said real time dynamic factors; and activating an instantaneous vehicle replacement trajectory depending on said branching condition such that said replacement trajectory accommodates effects of said real time dynamic factors by providing a second order GPS mechanism.

7. A computer system suitable for extending a utility of a Global Positioning System (GPS), said system comprising:

an input device for inputting a Global Positioning System (GPS) which is a first order mechanism for guiding a vehicle pursuant to a current destination and in accordance with a statically determined vehicle trajectory;

a processor for monitoring real time dynamic factors relating to a current vehicle trajectory, creating a branching condition for determining if said GPS first order mechanism must be modified responsive to said real time dynamic factors, and activating an instantaneous vehicle replacement trajectory depending on said branching condition such that said replacement trajectory accommodates effects of said real time dynamic factors by providing a second order GPS mechanism, said real time dynamic factors comprising at least one of road conditions and weather conditions; and a display device for showing a replacement trajectory.

8. A system according to claim 7, wherein said processor comprises a central processing unit (CPU).

9. A system according to claim 7, wherein said system is for being retrofitted onto an existing global positioning system.

10. A system according to claim 7, wherein said replacement trajectory comprises an optimum vehicle trajectory based on said dynamic factors.

11. A method according to claim 1, wherein said positioning system comprises at least one of a Global Positioning System (GPS) and a long-distance radio navigation system (LORAN).

* * * * *